United States Patent Office 2,919,423
Patented Dec. 29, 1959

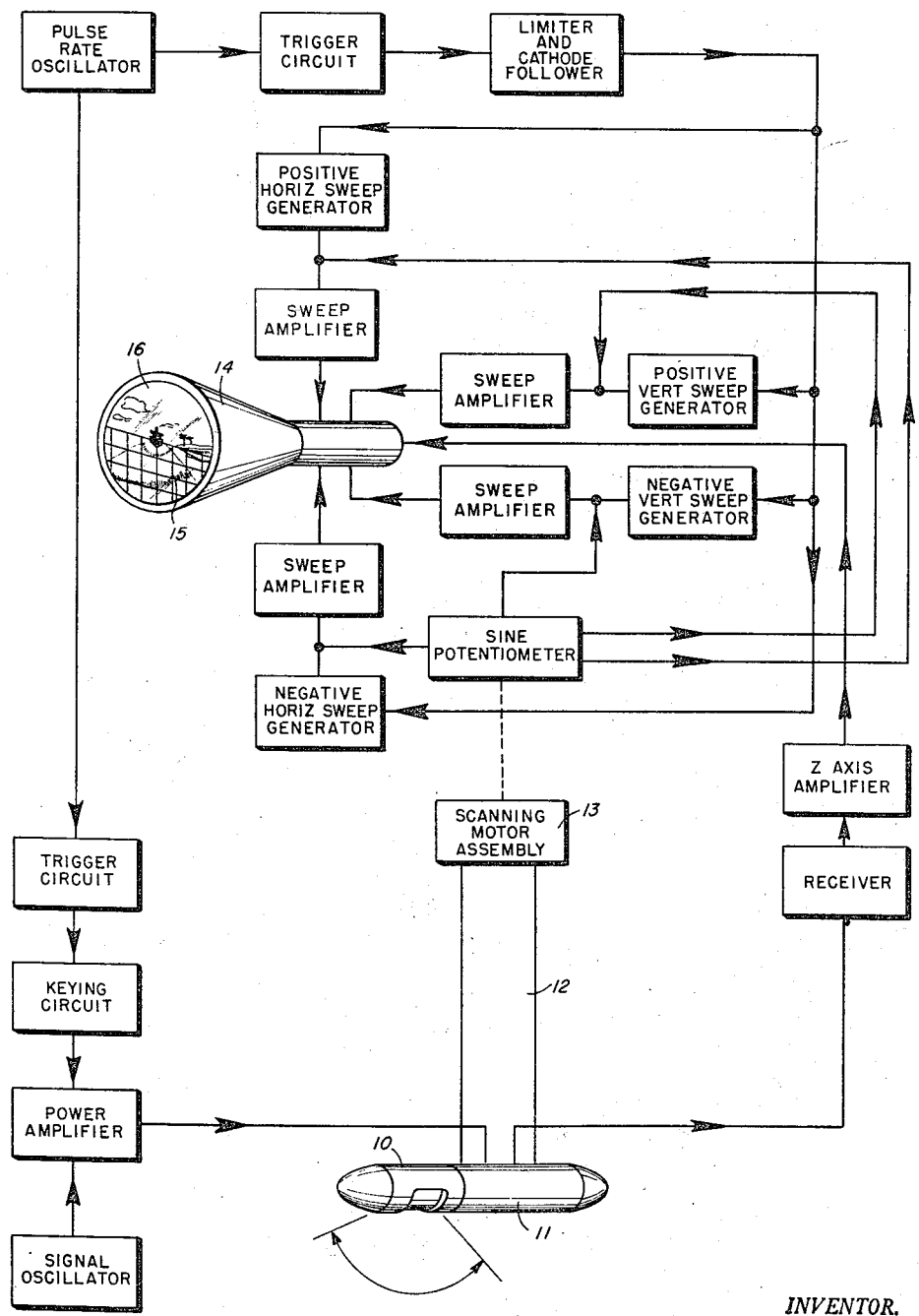

2,919,423

SUBMARINE BOTTOM SCANNER

William H. Williams, Glendale, and David A. Baldwin, San Diego, Calif., assignors to the United States of America as represented by the Secretary of the Navy Application April 29, 1954, Serial No. 426,616

1 Claim. (Cl. 340—3)

This invention relates to hydrographic surveying and more particularly to a contour bottom scanner which operates to draw or indicate a cross section of the bottom contour on the face of a cathode ray oscilloscope tube.

Numerous methods have been utilized in hydrographic surveys for obtaining the contour of the bottom below the surface of water. One commonly used method is the wire drag system which requires several ships and a large number of personnel for operation and consists essentially of towing a submerged suspended wire at a predetermined depth which depends on the draft of the ships likely to use the area and the configuration of the bottom. This wire-drag process is unwieldy, time-consuming, and tedious in its operation. Furthermore, it merely determines that there is a minimum depth of water along the particular traverses by the survey boat. Taking soundings at various points in an area by submerged leads or by the fathometer type of instrument is also an expensive, time-consuming job and will not produce comprehensive and accurate results.

The present system consists essentially of a transmitting, receiving and indicating system having apparatus consisting of a mechanically actuated piezoelectric transducer oscillating in a vertical plane, electronic circuits for transmitting, receiving and operating the indicating system and the cathode ray tube which displays the information obtained. The transducer transmits a series of supersonic pulses downwardly in a series of radial directions in a vertical plane and the echo pulses from the bottom are received by the transmitter and applied to the intensity control grid of the cathode ray oscilloscope tube in conjunction with a series of radial sweeps correlated with the timing of the pulses and the scanning angle of the transducer to present a display which in effect shows a vertical cross section through the water transverse to the direction of movement of the ship. By taking a series of timed photographs it is possible to obtain a series of profiles along the traverse of the ship through the water covering a substantial distance on both sides of the survey ship depending on the depth of the water and the range of the particular system.

One object of the present invention is to provide a system and apparatus for hydrographic surveys which will provide a rapid method of obtaining an accurate profile of the bottom in a vertical section at a series of points along a given traverse or course.

Another object of the present invention is to provide a system and apparatus for hydrographic surveying which will provide a better definition of the bottom and give more accurate contours for the final chart.

A further object of the present invention is to provide a system of hydrographic surveying which will provide definition inland beyond safe navigation areas thus adding to the completeness of the information obtainable.

Still another object of the present invention is to provide a system and display for presenting hydrographic information in a simple series of vertical sectional views which can be readily recorded and analyzed to provide accurate and readily understandable hydrographic information.

A still further object of the present invention is to provide an underwater survey system and apparatus which can be utilized for the detection and location of submerged objects such as obstructions, fish, and sunken ships.

Other objects and many of the attendant advantages of this invention will be readily appreciated as the same becomes better understand by reference to the following detailed description when considered in connection with the accompanying drawings wherein:

The figure is a schematic and block diagram illustrating one preferred embodiment of the present invention.

Referring now to the drawing in detail, an electro-acoustic transducer 10 is mounted for rotation on its fore and aft axis through an arc from 120 to 180 degrees as may be desired.

The transducer 10 is oscillated preferably through a drive mechanism enclosed in the housings 11 and 12 by a motor and gearing included in the scanning motor assembly 13.

The transducer 10 with its associated housings 11 and 12 and the motor 13 may be a portable unit which can be mounted over the side of the survey vessel or may be part of a permanent installation in the bottom of the hull of the survey vessel.

The motor or drive in assembly 13 may be mechanically or electrically connected to a sine potentiometer which is preferably included in the scanning motor assembly and is connected directly to the drive mechanism but is illustrated as a separate unit to clarify its relationships and function in the electronic circuits to be described infra.

The pulse rate oscillator in the upper left hand corner of the drawing establishes a suitable signal pulsing rate such as 24 pings per second and also provides synchronizing pulses to the radial sweep circuit through the trigger circuit and the limiter and cathode follower. The signal oscillator also applies a signal to the power amplifier which is in beat with that coming into the same amplifier from the previously discussed source.

The length of the signal pulses is regulated by the trigger circuit and they are then fed to the keying circuit in the cathode circuit of the power amplifier. When the keying circuit conducts the cathode circuit of the power amplifier is closed and the amplifier builds up signals from the signal oscillator and feeds them to the transducer. The transducer 10 is preferably a piezoelectric type which converts the electrical signal pulses into a relatively narrow beam of sonic or supersonic vibratory energy which is directed towards the bottom. The returning echoes are picked up by the transducer, converted into electrical signals and fed through the receiver to the Z axis terminals of the cathode ray tube 14 to vary the intensity of the radial sweep.

The sine potentiometer is preferably mechanically connected to the drive mechanism in the scanning motor assembly 13, so that it oscillates with the transducer 10 as the latter scans the bottom, and is equipped with two pairs of brushes (not shown) which develop two voltages proportional to the sine and cosine of the angular displacement from the zero position. These voltages represent electrically the direction of the beam of energy by its quadrature or rectangular components.

The sine potentiometer controls the saw tooth output of both of the horizontal and vertical sweep generators to control the amplitude of the output of the sweep amplifiers associated therewith. This results in a series of radial sweeps across the face of the cathode ray tube, when the output of the sweep amplifiers are applied to the deflection coils or deflection plates of the cathode ray tube 14.

These radial sweep lines are intensified by the echo signal passing through the receiver and the Z axis amplifier to the intensity grid of the cathode ray tube 14 to produce bright lines which are indicated in the drawings as dark lines 15 on the face of the cathode ray tube. As illustrated the face of the cathode ray tube is covered by a transparent overlay which provides a rectangular grid to facilitate scale measurements of the depth at different distances from the center line of the ship and an outline of a ship and clouds is also presented on the overlay to facilitate the interpretation of the picture as presented on the cathode ray tube 14, although these latter features are not necessarily essential to the operation of the system.

The series of intensified portions 15 of the radial lines provide an accurate profile of the bottom in a vertical plane transverse to the direction of the traverse of the survey boat or ship.

It will be apparent that the pulse rate of the oscillator may be varied to establish a pinging rate which is selected in accordance with the survey requirements and other factors.

The pinging rate will depend on the maximum slant range which is in turn controlled by the depth, angle and width desired in the survey. The transducer beam width will be controlling in determining the number of pings per sweep to provide a complete coverage of the bottom. These factors in turn will determine the maximum scanning rate or the number of sweeps per second. The scanning rate may be further limited to provide more detail by reducing the angle between adjacent echoes. The survey speed is controlled by all of the factors noted supra, and for lesser depths, slower survey speeds are necessary in order to compensate for the reduction in the effective area of the transducer beam with a decrease in depth.

The specific details of the transducer construction and the oscillating drive therefor may be varied considerably depending upon the particular type of application and operation desired. Likewise the specific circuitry for the various functions may vary depending upon the particular transducers used and the specific construction and operation of the cathode ray tube. However, the basic operation of the system and the general combination of the apparatus will be the same in all cases. The sine potentiometer may be replaced by other forms of resolvers for developing quadrature components or voltages which are the electrical equivalent of the direction of the beam of energy, and other means than a piezoelectric transducer may be utilized for transmitting beams of other forms of energy which can be transmitted through the water, reflected from the bottom or an object submerged below the surface of the water, and then received for display by the indicating apparatus.

Obviously many modifications and variations of the present invention are possible in the light of the above teachings. It is therefore to be understood that within the scope of the appended claim the invention may be practiced otherwise than as specifically described.

What is claimed is:

A hydrographic contour survey system for scanning and displaying submarine topography comprising in combination a pulse rate oscillator means for providing an output signal having a given number of pulses per unit time, a trigger circuit connected to the output of said pulse rate oscillator means for regulating the length of said pulses, a keying circuit connected to the output of said trigger circuit for producing a keyed output signal, signal oscillator means for providing a signal of predetermined frequency, a power amplifier connected to said keying circuit and said signal oscillator means for response to said keyed output signal and said predetermined frequency signal and for producing a gated power output signal, a rotatable electroacoustical transducer connected to said power amplifier for receiving the gated power output signal therefrom, said transducer being capable of both transmitting acoustical energy upon excitation by said gated power output signal and producing an electrical output signal upon excitation by received acoustical energy, a receiver coupled to said transducer for response to the electrical output signal produced thereby during acoustical energy reception, a cathode ray tube coupled to the output of said receiver, means connected to said cathode ray tube for producing a series of radial sweeps across the face thereof, means coupled between the aforesaid pulse rate oscillator means and said radial sweep producing means for synchronizing the pulses from said pulse rate oscillator means with the sweeps across the face of said cathode ray tube, motor means connected to said transducer for rotating same for angular scanning movement back and forth between spaced positional limits, and sine potentiometer means interconnecting said motor means and said radial sweep producing means for synchronizing said series of radial sweeps across the face of said cathode ray tube with the corresponding angular scanning movements of said electroacoustical transducer.

References Cited in the file of this patent
UNITED STATES PATENTS

| | | |
|---|---|---|
| 2,411,071 | Wade | Nov. 12, 1946 |
| 2,519,898 | Gardiner | Aug. 22, 1950 |
| 2,536,771 | Rost et al. | Jan. 2, 1951 |
| 2,562,987 | Laws | Aug. 7, 1951 |
| 2,631,270 | Goble | Mar. 10, 1953 |
| 2,703,396 | Rich | Mar. 1, 1955 |
| 2,709,252 | Tasker | May 24, 1955 |
| 2,759,783 | Ross | Aug. 21, 1956 |
| 2,776,396 | Gille et al. | Jan. 1, 1957 |
| 2,825,884 | Fryklund | Mar. 4, 1958 |

OTHER REFERENCES

"Cathode Ray Tube Display" (Soller et al.), Radiation Laboratory Series No. 22, published by McGraw-Hill (New York), 1948, page 451 is relied on.